Oct. 31, 1961 R. O. WATSON 3,006,064

METHOD FOR REPAIRING WORN SURFACES IN SHAFTS

Filed Aug. 22, 1958

INVENTOR.
RALPH O. WATSON
BY
Patrick D. Beavers
ATTY.

United States Patent Office 3,006,064
Patented Oct. 31, 1961

3,006,064
METHOD FOR REPAIRING WORN SURFACES IN SHAFTS
Ralph O. Watson, 415 5th Ave. South, Glasgow, Mont.
Filed Aug. 22, 1958, Ser. No. 756,718
6 Claims. (Cl. 29—401)

This invention relates to improvements in repairing worn surfaces of shafts that have been worn from bearing seizure, bearing boxes or stuffing boxes.

An object of this invention is to provide a method for repairing worn surfaces in shafts so that the shafts may be repaired to prevent the entire replacement thereof.

By the use of this method armature shafts for electric motors may be repaired without damage to the winding thereon because very little heat is required for carrying out the method.

With the above and other objects and advantages in view the invention consists of the various steps of procedure that are required to carry out the method which is more fully hereinafter described, claimed and illustrated in the accompanying drawing, in which:

Figure 1:
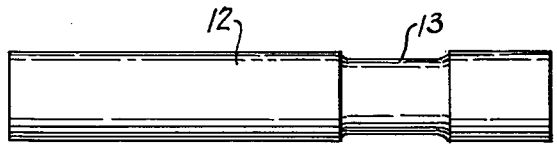
FIG. 1 is an elevational view of a shaft showing the first step of the method embodying the invention.
Figure 2:
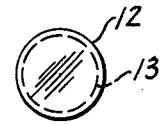
FIG. 2 is an end view of the shaft of FIG. 1.
Figure 3:
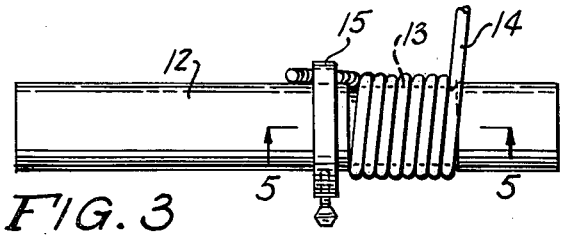
FIG. 3 is an elevational view showing the second step of the method.
Figure 4:
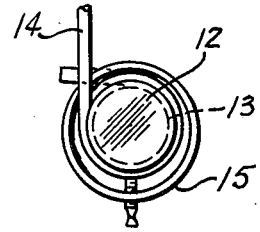
FIG. 4 is an end view of FIG. 3.

Referring more in detail to the drawing, wherein like parts are designated by like reference numerals, the reference numeral 12 is used to designate a shaft that is used to illustrate the method embodying the invention.

In order to carry out the method embodying the invention, a shaft 12 that has a worn spot therein is repaired as hereinafter described.

The worn spot is machined out as at 13, so that the bottom of the worn spot is even and at a depth of approximately one-half of the thickness of a strand of repair wire 14.

The second step of the method comprises securing one end of the wire 14 to the shaft 12 by a clamp 15. The wire 14 may be a flexible weld rod or a silver solder coated steel wire of a sufficient diameter to permit the wire 14 to extend above the machined cutout 13 for approximately one-half of the diameter of the wire 14.

The shaft 12 is then placed in a lathe and after the wire 14 has been slightly preheated the shaft 12 is rotated and the wire 14 is tightly wound onto the shaft 12 within the machined cutout 13.

Figure 5:
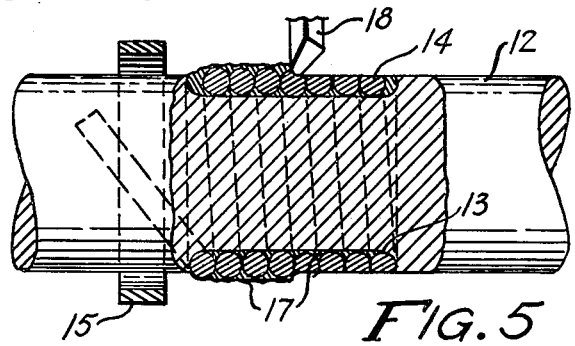
FIG. 5 is an elevational view showing the third step of the method.

A third step of the method consists in applying solder flux and silver solder on the wire 14 as at 17, FIG. 5. In some instances, tin lead may be used.

After the solder has cooled the shaft 12 is turned down to normal size, by a lathe tool 18, as shown in FIG. 5.

Figure 6:
FIG. 6 is an elevational view of the shaft, partly in section, showing the shaft that has been completely restored.

The solder will firmly fix the wire 14 in the cutout 13 and when the shaft 12 has been properly machined the shaft 12 will be in perfect condition and as good as new, as shown in FIG. 6.

Figure 7:
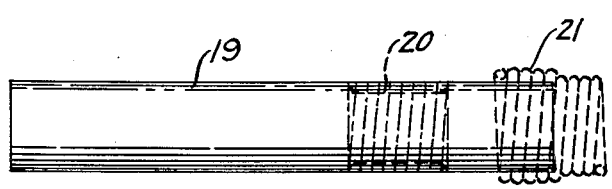
FIG. 7 is an elevational view, showing a modification of the invention.
Figure 8:
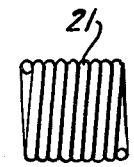
FIG. 8 is an elevational view showing a coiled spring that is used in the modification shown in FIG. 7.

In FIGS. 7 and 8 a modified method is used to repair a worn spot in a shaft 19.

The worn spot is machined out as at 20 so that the bottom of the worn spot is even and at a depth of approximately one-half the thickness of the steel wire that is used to form a coil spring 21.

The coil spring 21 is first prewound so that the inside diameter thereof is slightly smaller than the diameter of the machined spot 20 and the steel wire forming the coil spring 21 is of sufficient thickness so that the outer surface thereof will be above the outer surface of the shaft 19.

The coil spring 21 is slid over the end of the shaft 19 as shown in FIG. 7. After it has been positioned in the worn spot 20 solder flux and silver solder is applied as previously described. After the solder has cooled, the shaft 19 is turned down to normal size. The solder will firmly fix the spring 21 in the machined spot 20 and when the shaft 19 has been properly machined the shaft 19 will be in perfect condition and as good as new as shown in FIG. 7.

There has thus been provided a method and a modification thereof which will repair a shaft having worn spots therein so that the shaft is returned to its original condition.

It is believed that from the foregoing description the method of restoring the shaft will be apparent to those skilled in the art and it is to be understood that changes in the steps and manner of carrying out the method may be resorted to provided they fall within the spirit of the invention and the scope of the appended claims.

Having thus described the invention what is claimed as new and desired to be secured by Letters Patent is:

1. A method for repairing worn spots in a worn area in a shaft comprising the steps of machining the worn area of the shaft to a predetermined depth to eliminate said worn area, fixing one end of a strand of wire material to the shaft and then rotating the shaft to wind the strand of wire onto the machined portion of the shaft until said wire covers the entire machined area, applying solder flux, soldering the wire in place on the machined portion and then machining the shaft to its original diameter.

2. A method as in claim 1, wherein the depth of the machined portion is one-half of the diameter of the strand of wire.

3. A method as in claim 1, wherein the strand of wire is silver coated steel wire to form a more perfect bond between the turns of the strand of wire.

4. The method defined in claim 1, wherein the strand of wire is preheated to secure upon cooling tight engagement thereof with said shaft.

5. A method for repairing worn spots in a worn area in a shaft comprising the steps of machining the worn area of the shaft to a predetermined depth to eliminate said worn area, placing a coiled strand of steel wire on the shaft covering the entire machined area of the shaft, applying solder flux, soldering the coiled strand of steel wire in place on the machined portion and then machining the outer surface of the coiled strand of steel wire to reduce it to the original diameter of the shaft.

6. A method for repairing worn spots in a worn area in a shaft comprising the steps of machining the worn area of the shaft to a predetermined depth to eliminate said worn area and to a sufficient length to accommodate a coil spring of steel wire, sliding a preformed coiled spring of steel wire having an inside diameter slightly smaller than the diameter of the machined area and having a length that is substantially the same as said machined area over end of said shaft and positioning said preformed coil spring on the machined area of the shaft, applying solder flux, soldering the coiled spring in place on the machined portion and then machining the outer surface of the coil spring to reduce it to the original diameter of the shaft.

References Cited in the file of this patent

UNITED STATES PATENTS

| | | |
|---|---|---|
| 1,357,739 | Steenstrup | Nov. 2, 1920 |
| 1,374,624 | Zumwalt | Apr. 12, 1921 |
| 1,722,025 | Wagener | July 23, 1929 |
| 1,884,104 | Moore | Oct. 25, 1932 |
| 1,947,493 | Rose | Feb. 20, 1934 |
| 2,182,238 | Rasmussen | Dec. 5, 1939 |
| 2,210,353 | Barnes | Aug. 6, 1940 |
| 2,373,038 | Lindsay | Apr. 3, 1945 |
| 2,410,850 | Wasserman | Nov. 12, 1946 |
| 2,463,580 | Warshyk | Mar. 8, 1949 |

FOREIGN PATENTS

| | | |
|---|---|---|
| 838,972 | France | Dec. 16, 1938 |
| 109,334 | Australia | Dec. 21, 1939 |